(12) United States Patent
Stegmaier et al.

(10) Patent No.: US 8,720,202 B2
(45) Date of Patent: May 13, 2014

(54) INTERNAL COMBUSTION ENGINE

(75) Inventors: Juergen Stegmaier, Ludwigsburg (DE); Martin Cichon, Stuttgart (DE); Manfred Schmitt, Heppenheim (DE); Bernd Banzhaf, Stuttgart (DE); Achim Schmidt, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/390,590

(22) PCT Filed: Aug. 3, 2010

(86) PCT No.: PCT/EP2010/061255
§ 371 (c)(1), (2), (4) Date: Apr. 27, 2012

(87) PCT Pub. No.: WO2011/035967
PCT Pub. Date: Mar. 31, 2011

(65) Prior Publication Data
US 2012/0204558 A1    Aug. 16, 2012

(30) Foreign Application Priority Data
Sep. 23, 2009   (DE) .......................... 10 2009 044 913

(51) Int. Cl.
F02B 33/44   (2006.01)
F02G 3/00    (2006.01)
F01K 23/10   (2006.01)

(52) U.S. Cl.
USPC ................. 60/605.2; 60/616; 60/618; 60/612

(58) Field of Classification Search
CPC ............. F02M 25/07; F02M 25/0739; F02M 25/0715; F02M 25/0711; F02M 25/0713; F02B 37/013; F02B 37/00; F02B 37/004; F02B 29/0412; F02G 5/02; Y02T 10/121; Y02T 10/16; F01N 5/02
USPC ....................................... 60/605.2, 612, 618
See application file for complete search history.

(56) References Cited

U.S. PATENT DOCUMENTS

| | | | | |
|---|---|---|---|---|
| 5,794,445 | A  * | 8/1998  | Dungner ...................... | 60/605.2 |
| 5,937,651 | A    | 8/1999  | Braun et al. | |
| 6,041,602 | A    | 3/2000  | Dickey | |
| 6,412,278 | B1   | 7/2002  | Matthews | |
| 7,165,403 | B2 * | 1/2007  | Sun et al. ..................... | 60/605.2 |
| 7,490,462 | B2 * | 2/2009  | Roozenboom et al. ...... | 60/605.2 |
| 2003/0154716 | A1 * | 8/2003  | Redon .......................... | 60/605.2 |
| 2009/0277173 | A1 * | 11/2009 | Ernst et al. ..................... | 60/616 |
| 2010/0064685 | A1 * | 3/2010  | Auffret et al. ................ | 60/605.2 |
| 2010/0146967 | A1 * | 6/2010  | Simpson et al. ............. | 60/605.2 |
| 2011/0209473 | A1 * | 9/2011  | Fritz et al. .................... | 60/605.2 |

FOREIGN PATENT DOCUMENTS

| | | |
|---|---|---|
| CN | 1987064 | 6/2007 |
| DE | 197 28 353 | 9/1998 |
| DE | 102006055814 | 5/2008 |
| EP | 0740065 | 10/1996 |
| EP | 0889226 | 1/1999 |
| JP | 2005-188359 | 7/2005 |
| JP | 2007-239566 | 9/2007 |
| JP | 2009-167827 | 7/2009 |
| WO | WO 98/32964 | 7/1998 |
| WO | WO 98/35153 | 8/1998 |
| WO | WO 01/50010 | 7/2001 |

OTHER PUBLICATIONS

International Search Report, PCT International Application No. PCT/EP2010/061255, dated Feb. 22, 2011.

* cited by examiner

*Primary Examiner* — Thai Ba Trieu
*Assistant Examiner* — Ngoc T Nguyen
(74) *Attorney, Agent, or Firm* — Kenyon & Kenyon LLP

(57) ABSTRACT

An internal combustion engine having an exhaust gas recirculation device for recirculating exhaust gas of the internal combustion engine to a fresh-air side of the internal combustion engine. For this purpose, it is provided that the exhaust gas recirculation device has at least one compressor for compressing the exhaust gas supplied to the fresh-air side of the internal combustion engine.

8 Claims, 1 Drawing Sheet

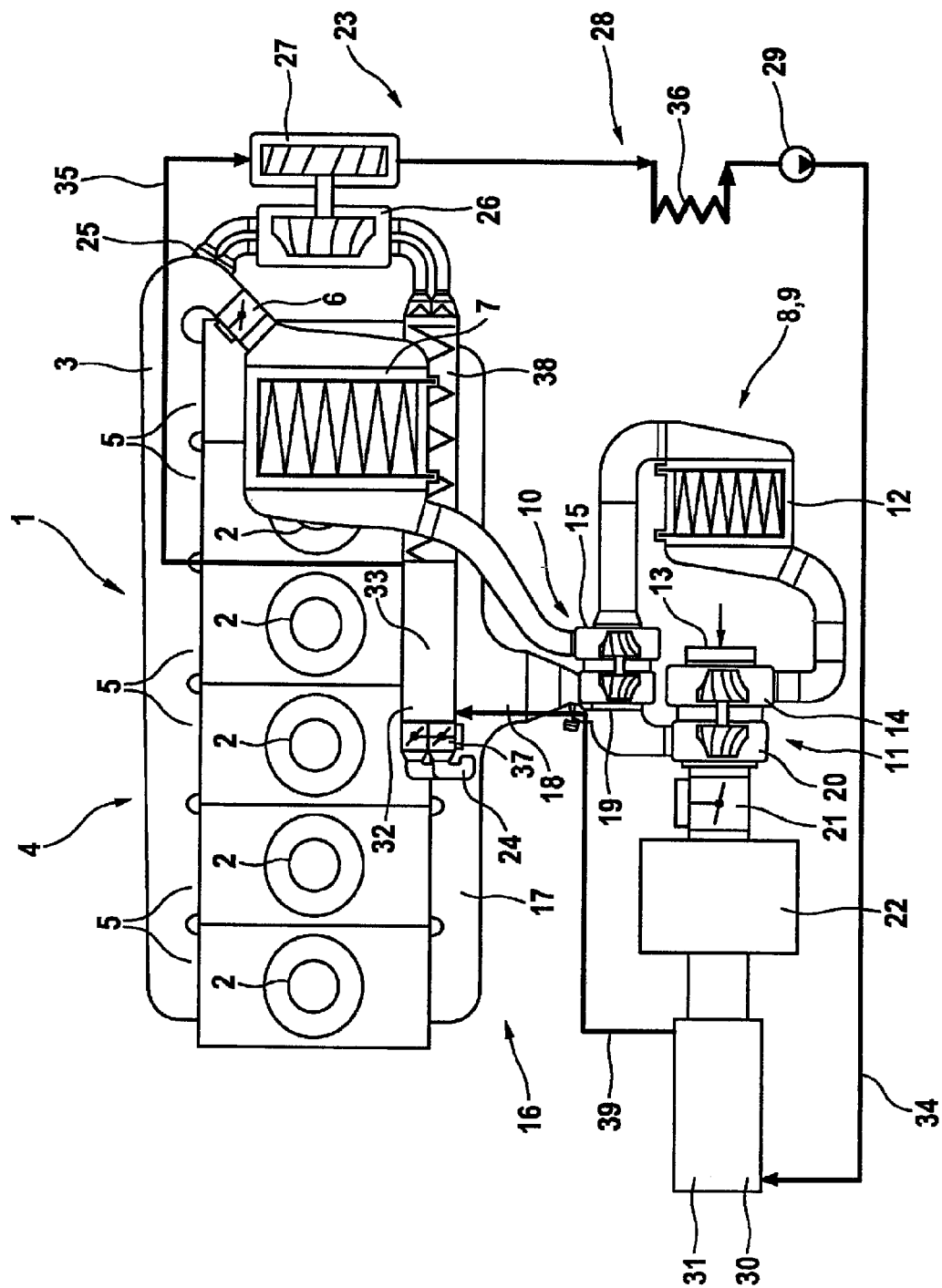

INTERNAL COMBUSTION ENGINE

FIELD OF THE INVENTION

The present invention relates to an internal combustion engine having an exhaust gas recirculation device for recirculating exhaust gas of the internal combustion engine to a fresh-air side of the internal combustion engine.

BACKGROUND INFORMATION

When developing internal combustion engines, the reduction of harmful substances, which are created during the combustion in the internal combustion engine, play an increasingly larger role. On the one hand, suitable exhaust gas purification devices or exhaust aftertreatment devices, such as catalytic converters, may be provided in order to filter the created harmful substances out of the exhaust gas after they have been expelled from the internal combustion engine or to convert them into less harmful products. On the other hand, the object is, however, to prevent the harmful substances from being created in the first place.

One possibility for achieving this object is to provide an exhaust gas recirculation. Here, the exhaust gas of the internal combustion engine created during the combustion is not immediately removed and released into a surrounding, but is resupplied to the internal combustion engine together with fresh air and fuel. For this purpose, the exhaust gas is recirculated to the fresh-air side of the internal combustion engine. In this way, the nitrogen oxide amount contained in the exhaust gas may be reduced. The combustion temperature prevailing in the internal combustion engine is initially reduced due to the exhaust gas recirculation. This is due to the fact that although the exhaust gas does not partake in the combustion itself, it still must be heated during the combustion. Such a reduction in the combustion temperature results in a reduction of the nitrogen oxide ($NO_x$) content. Moreover, the exhaust gas recirculation causes a reduced oxygen content during the combustion. Nitrogen oxides are, however, preferably created if there is excess air, so that the nitrogen oxide content is further reduced. It must be noted, however, that the amount of oxygen present during the combustion may not be too small because hydrocarbons (HC) may otherwise form, which is not desirable either.

The effect of the exhaust gas recirculation may be further improved by cooling the recirculated exhaust gas. In this regard, German Patent Application No. DE 10 2006 055 814 A1, for example, describes an internal combustion engine having a turbocharger (charging device), the exhaust gases of the internal combustion engine being taken from an exhaust gas system and fed into its fresh-air line, so that the fresh air with the exhaust gases mixed in there is compressed in a compressor part of the turbocharger and is supplied to an intake-side inlet manifold. A cooling element is integrated into the inlet manifold and is designed in such a way that the possibly created condensate may only flow into the direction of the intake valves of the internal combustion engine, and the fresh air which is mixed with the exhaust gases is cooled within the inlet manifold, the inlet manifold emptying into an air diffuser. Thus, the exhaust gas is recirculated to the low pressure level before a compressor turbine, in order to be able to bring a larger amount of the exhaust gas to the fresh-air side of the internal combustion engine, and the temperature of the exhaust gas is subsequently reduced, together with that of the fresh air.

Another possibility for recirculating a larger amount of exhaust gas to the fresh-air side of the internal combustion engine is to provide a throttle valve to the fresh-air side or in a fresh-air supply, in order to temporarily reduce the pressure prevailing there, in particular an intake pipe pressure. If the internal combustion engine has a charging device, the recirculated exhaust gas must be compressed together with the fresh air. This means that the charger output must be significantly increased because the additional exhaust gas mass flow is to be taken into account. This also applies when a throttle valve is used, since the charging device must now compensate for the throttle losses. Consequently, the fuel consumption also increases because the intake action increases due to the reduced pressure available to the internal combustion engine.

SUMMARY

An example internal combustion engine in accordance with the present invention may have the advantage that the exhaust gas may be recirculated to the fresh-air side of the internal combustion engine without the need for increasing the fuel consumption of the internal combustion engine and/or, if a charging device is provided, the necessary charger output. This is achieved according to the present invention in that the exhaust gas recirculation device has at least one compressor for compressing the exhaust gas which is supplied to the fresh-air side of the internal combustion engine. The compressor is used for compressing, i.e., for a pressure boost, of the exhaust gas. For this purpose, the compressor is assigned to the exhaust gas recirculation device, i.e., it compresses the exhaust gas before it reaches the fresh-air side of the internal combustion engine, where it mixes with the fresh air which is supplied to the internal combustion engine. The compressor is situated directly in an exhaust gas recirculation line in which the recirculated exhaust gas prevails exclusively. The exhaust gas recirculation device is thus a unit which is present separately from the fresh-air side. The compressor is consequently not the compressor of a possibly provided charging device of the internal combustion engine. The recirculated exhaust gas is rather compressed before it reaches the fresh-air side, i.e., before it is combined with the fresh air. The compressor of the exhaust gas recirculation device allows the exhaust gas to be supplied to the fresh-air side downstream from a compressor of the charging device because the exhaust gas is already at a sufficiently high pressure level. With the aid of the compressor, the pressure of the exhaust gas is boosted, whereby a larger amount of the exhaust gas may be brought to the fresh-air side and may thus be resupplied to the internal combustion engine.

One refinement of the present invention provides thermal energy, which has been extracted from the exhaust gas, for operating the compressor. This embodiment variant allows for a particularly energy-efficient operation of the compressor. The thermal energy is present in the exhaust gas anyway and would be discharged unused into a surrounding of the internal combustion engine if it is not used to operate the compressor. The amount of the recirculated exhaust gas may thus be increased without increasing the fuel consumption of the internal combustion engine or the need for providing a greater output of the charging device. For extracting the thermal energy from the exhaust gas, a steam cycle may be provided.

One refinement of the present invention provides that a heat exchanger is provided for extracting thermal energy. The heat exchanger is thus a component of an exhaust gas system of the internal combustion engine, for example. The heat exchanger is assigned to the exhaust gas system and is preferably situated downstream from the possibly present charging device and/or exhaust gas purification device. As a function of the energy demand of the compressor, the heat exchanger may, however, also be situated in an area of the exhaust gas system, in which a higher temperature of the exhaust gas prevails, i.e., before the charging device and/or the exhaust gas purification devices.

One refinement of the present invention provides that the heat exchanger is connected to a steam generator for evaporating a fluid, and the generated steam is supplied to a turbine which is operatively linked to the compressor. With the aid of the heat exchanger, thermal energy is thus extracted from the exhaust gas, which is subsequently used in the steam generator, in order to evaporate the fluid, e.g., water, and thus generate steam. This steam is guided via a turbine, the energy present in the steam being converted into mechanical energy. In this case, the turbine is operatively linked to the compressor via a shared shaft, for example, i.e., it is used to drive the compressor.

One refinement of the present invention provides that the compressor is situated downstream or upstream from the at least one exhaust gas cooler. The exhaust gas cooler is used to cool the exhaust gas either upstream from the compressor or downstream from the compressor. Cooling the exhaust gas increases the effect of the exhaust gas recirculation device, since the combustion temperature in the internal combustion engine may be further decreased in this way. The compressor is preferably situated downstream from the exhaust gas cooler because the thermal load of the compressor is reduced in this way, and the necessary compressor output is reduced due to the higher density of the cooler exhaust gas. Fundamentally, the compressor may, however, also be situated upstream from the exhaust gas cooler because the heat transfer within the exhaust gas cooler is improved due to the higher temperature of the compressed exhaust gas and the compressor may thus have a smaller design.

One refinement of the present invention provides that the heat exchanger forms the exhaust gas cooler at least partially or that the exhaust gas cooler is an additional heat exchanger which is connected to the steam generator. The heat exchanger for extracting thermal energy from the exhaust gas may be used to cool the exhaust gas, i.e., the recirculated exhaust gas. For this purpose, the heat exchanger forms the exhaust gas cooler at least partially. However, it is also possible to provide multiple heat exchangers out of which only at least one is used as an exhaust gas cooler. The heat exchanger is then an additional heat exchanger, for example, which is connected to the steam generator. A low-temperature heat exchanger and a high-temperature heat exchanger may also be provided, which are connected in series, for operating the steam generator. If multiple heat exchangers are provided, multiple steam generators may definitely be provided as well, which are also connected in series, for example.

One refinement of the present invention provides an at least single-stage charging device, in particular an exhaust gas turbocharger. The charging device is assigned to the fresh-air side of the internal combustion engine and is used to compress the fresh air supplied to the internal combustion engine and thus boost its pressure. In particular, the charging device is used for improved filling of fresh air into the combustion chambers or cylinders of the internal combustion engine. The charging device is advantageously designed as an exhaust gas turbocharger, i.e., it is operated using exhaust gas of the internal combustion engine. For this purpose, the exhaust gas flows via an exhaust gas turbine of the exhaust gas turbocharger and thus drives a compressor of the exhaust gas turbocharger to boost the pressure of the fresh air.

One refinement of the present invention provides that an exhaust gas extraction connector for extracting the exhaust gas, which was supplied to the internal combustion engine, is situated downstream or upstream from the exhaust gas turbocharger. The exhaust gas may thus be extracted from the exhaust gas system of the internal combustion engine before it flows through the exhaust gas turbocharger or only after that. Placing the exhaust gas extraction connector upstream from the exhaust gas turbocharger is preferred. At this point, the exhaust gas still has a relatively high pressure level, for which reason relatively low output is required for compressing the exhaust gas in the exhaust gas recirculation device. Additionally, the exhaust gas temperature is higher than if it were downstream from the exhaust gas turbocharger, so that a heat exchanger which is situated at this place may be optimally used to generate steam. In this way, a superheating of the steam may, for example, be carried out. Alternatively, the exhaust gas extraction connector may, however, be situated downstream from the exhaust gas turbocharger. The advantage here is that the exhaust gas extraction does not reduce the output of the exhaust gas turbocharger.

One refinement of the present invention provides that, in the case of a multistage exhaust gas turbocharger, the exhaust gas extraction connector is provided between the stages. In this case, the exhaust gas turbocharger has, for example, a high-pressure part, which is composed of a high-pressure turbine and a high-pressure compressor, as well as a low-pressure part, which is composed of a low-pressure turbine and a low-pressure compressor. In this case, the exhaust gas initially flows via the high-pressure turbine and subsequently via the low-pressure turbine. The exhaust gas extraction connector is now situated between the stages, i.e., downstream from the high-pressure turbine and upstream from the low-pressure turbine.

One refinement of the present invention provides that a condenser and/or a fluid conveyor is/are provided downstream from the turbine of the exhaust gas recirculation device. With the aid of the turbine, the compressor of the exhaust gas recirculation device is driven, in particular by overflowing the turbine with the steam generated with the aid of the steam generator. The turbine is thus a component of a steam cycle. The condenser and/or the fluid conveyor is/are also provided in the latter. The condenser is used downstream from the turbine to condense the steam, so that fluid prevails again downstream from the condenser. With the aid of the fluid conveyor, which is usually provided downstream from the condenser, the fluid is resupplied to the steam generator. Thus, a closed fluid or steam cycle exists with the aid of which the compressor of the exhaust gas recirculation device is operable.

The present invention is explained below in greater detail with reference to the exemplary embodiments shown in the FIGURE, without limitations to the present invention.

BRIEF DESCRIPTION OF THE DRAWING

FIG. 1 shows a schematic view of an internal combustion engine.

DETAILED DESCRIPTION OF EXAMPLE EMBODIMENTS

The FIGURE shows an internal combustion engine 1 having at least one cylinder 2 which may be supplied with air via an air-supply device 3 for carrying out a combustion. In this case, air supply device 3 is provided on a fresh-air side 4 of internal combustion engine 1. In addition to air supply manifold 5 via which cylinder 2 is supplied with air, air supply device 3 also has a throttle valve 6, a loading air cooler 7 and a charging device 8. Charging device 8 is an exhaust-gas turbocharger 9 having a high-pressure part 10, a low-pressure part 11 and an intermediate cooler 12 which is situated in between.

During an operation of internal combustion engine 1, air is taken in via an air intake 13 and compressed with the aid of a low-pressure compressor 14 of low-pressure part 11. Due to the compression, the air prevails at a higher pressure and a higher temperature. The temperature is reduced downstream from low-pressure compressor 14 with the aid of intermediate cooler 12, before the air is subsequently further compressed with the aid of a high-pressure compressor 15 of high-pressure part 10. Downstream from high-pressure compressor 15, the air is, in turn, cooled down, this time with the aid of charge air cooler 7. The air may reach air supply manifold 5 via throttle valve 6 and thus enter cylinders 2 via intake valves (not shown). In this case, throttle valve 6 is used to adjust the amount of air which is supposed to enter cylinders 2.

After the combustion in internal combustion engine 1, the resulting exhaust gas is discharged into an exhaust gas system 16. The latter initially has an exhaust manifold 17 and an exhaust collector 18 which are connected to cylinders 2 or to the discharge valves assigned to them. With the aid of exhaust manifold 17 or exhaust collector 18, the exhaust gas of cylinders 2 is combined. Subsequently, the exhaust gas reaches exhaust gas turbocharger 9. There, it first flows through a high-pressure turbine 19 of high-pressure part 10 and subsequently through a low-pressure turbine 20 of low-pressure part 11. Exhaust gas turbocharger 9 is thus double-stage. High-pressure turbine 19 drives high-pressure compressor 15 and low-pressure turbine 20 drives low-pressure compressor 14. Downstream from low-pressure turbine 20, the exhaust gas reaches via a throttle valve 21 an exhaust aftertreatment device or an exhaust gas purification device 22 which may have at least one catalytic converter and/or one filter.

Additionally, internal combustion engine 1 has an exhaust gas recirculation device 23. In this case, at least one exhaust gas extraction connector 24 is provided in order to extract exhaust gas from exhaust manifold 17 or exhaust collector 18, and to bring it to fresh-air side 4 of internal combustion engine 1 with the aid of at least one exhaust gas supply connector 25. In the illustrated example, the exhaust gas supply connector 25 is situated downstream from throttle valve 6, so that, if necessary, the pressure of the fresh air may be reduced for a short period of time with the aid of throttle valve 6 in order to allow the exhaust gas to be supplied through exhaust gas supply connector 25. Such a procedure usually reduces the performance of internal combustion engine 1. For this reason, it is provided that the pressure of the exhaust gas is boosted with the aid of a compressor 26, so that the exhaust gas may be brought to fresh-air side 4 without the need for using a closing throttle valve 6.

Compressor 26 is driven by a turbine 27 which is provided in a steam cycle 28 of exhaust gas recirculation device 23. Steam cycle 28 has a fluid conveyor 29, in particular a pump, a first heat exchanger 30 having a first steam generator 31 as well as a second heat exchanger 32 having a second steam generator 33. With the aid of heat exchangers 30 and 32, thermal energy is extracted from the exhaust gas of internal combustion engine 1, and this thermal energy is used to evaporate a fluid, which is contained in a fluid line 34, with the aid of steam generators 31 and 33, and the resulting steam is supplied to turbine 27 via a steam line 35. Downstream from turbine 27, a condenser 36 is situated which condenses the remaining steam so that fluid which is conveyed once again with the aid of fluid conveyor 29 downstream from condenser 36 prevails again. Downstream from exhaust gas extraction connector 24, but upstream from second heat exchanger 32, at least one throttle valve 37 is provided, with the aid of which the exhaust gas amount, which is supplied to fresh-air side 4 of internal combustion engine 1, may be adjusted.

Second heat exchanger 32 forms, in at least some areas, an exhaust gas cooler 38. Exhaust gas cooler 38 is used to cool the exhaust gas following its extraction with the aid of exhaust gas extraction connector 24, before it reaches fresh-air side 4 of internal combustion engine 1 via exhaust gas supply connector 24. In this case, exhaust gas cooler 38 is provided upstream from compressor 26. Second heat exchanger 32 is provided, as explained above, downstream from throttle valve 37, i.e., immediately downstream from exhaust gas extraction connector 24. At this point, the exhaust gas, which has just been expelled from cylinders 2, has a high temperature, so that second heat exchanger 32 may also be referred to as a superheater. In contrast, first heat exchanger 30 is provided downstream from exhaust gas purification device 22 in exhaust gas system 16, i.e., immediately before the exhaust gas is discharged from internal combustion engine 1 into a surrounding.

In this way, the thermal energy which is still contained in the exhaust gas may be used to evaporate the fluid, which was conveyed in fluid line 34, with the aid of first steam generator 31 which is operatively linked to first heat exchanger 30, thus preferably producing saturated steam. This saturated steam is subsequently supplied via a saturated steam line 39 to second steam generator 33 which is operatively linked to second heat exchanger 32. For this reason, a higher temperature prevails in second steam generator 33 than in first steam generator 31. The saturated steam supplied via saturated steam line 39 may thus be superheated in second steam generator 33, so that superheated steam subsequently prevails which is supplied to turbine 27 via steam line 35. In this way, the thermal energy contained in the exhaust gas is used to operate compressor 26. With the aid of the latter, the exhaust gas, which is supposed to be recirculated to fresh-air side 4 of internal combustion engine 1, is brought to a higher pressure, i.e., compressed. A larger exhaust gas amount may thus be brought to fresh-air side 4 than without the pressure boost, thus reducing the amount of the nitrogen oxides which are created in cylinders 2 during the combustion. In this case, it is not necessary to reduce the pressure on fresh-air side 4 with the aid of throttle valve 6 in order to supply the exhaust gas through exhaust gas supply connector 25, since the exhaust gas has a sufficiently high pressure.

Since the thermal energy, which is used to operate compressor 26, is primarily extracted downstream from exhaust gas purification device 22, but would otherwise be discharged into the surroundings together with the exhaust gas, the efficiency of the combustion in internal combustion engine 1 may be significantly increased in this way, without additional energy use. The position of exhaust gas extraction connector 24 is shown in the FIGURE only as an example.

Alternatively, it would also be possible to extract the exhaust gas between high-pressure turbine 19 and low-pressure turbine 20 or downstream from low-pressure turbine 20. However, an extraction from exhaust manifold 17 or exhaust collector 18 has the advantage that the exhaust gas is still at a high pressure level, so that less compressing power is needed from compressor 26 to achieve a desired pressure level of the exhaust gas. With the aid of second heat exchanger 32, heat is extracted from the exhaust gas in order to operate second steam generator 33. The temperature of the exhaust gas is thus reduced before it enters compressor 26. In this way, the thermal load of compressor 26 is reduced, on the one hand, and, on the other hand, a lower exhaust gas temperature is advantageous, since the nitrogen oxide content in the exhaust gases of internal combustion engine 1 is further reduced in this way because the combustion temperature in cylinders 2 is reduced. Charge air cooler 7 and intermediate cooler 12 are also used for the same purpose.

What is claimed is:

1. An internal combustion engine having an exhaust gas recirculation device for recirculating exhaust gas of the internal combustion engine to a fresh-air side of the internal combustion engine, the exhaust gas recirculation device having at least one compressor for compressing the exhaust gas which is supplied to the fresh-air side of the internal combustion engine, and a heat exchanger for extracting thermal energy from the exhaust gas, the extracted thermal energy being provided for operating the compressor,
    wherein the heat exchanger is connected to a steam generator for evaporating a fluid to generate steam, and the generated steam is supplied to a turbine which is operatively linked to the compressor.

2. The internal combustion engine as recited in claim 1, wherein the compressor is situated downstream or upstream from at least one exhaust gas cooler.

3. The internal combustion engine as recited in claim 2, wherein the heat exchanger forms the exhaust gas cooler at least partially, or the exhaust gas cooler is an additional heat exchanger which is connected to the steam generator.

4. The internal combustion engine as recited in claim 1, further comprising an exhaust gas turbocharger.

5. The internal combustion engine as recited in claim 4, wherein an exhaust gas extraction connector for extracting the exhaust gas, which is supplied to the internal combustion engine, is situated upstream or downstream from the exhaust gas turbocharger.

6. The internal combustion engine as recited in claim 4, wherein the exhaust gas turbocharger is a multistage exhaust gas turbocharger, and an exhaust gas extraction connector is provided between stages in the multistage exhaust gas turbocharger.

7. The internal combustion engine as recited in claim 1, wherein at least one of a condenser, and a fluid conveyor is provided downstream from the turbine.

8. The internal combustion engine as recited in claim 1, wherein the turbine is operatively linked to the compressor via a shared shaft.

* * * * *